US010021066B2

(12) United States Patent
Keis et al.

(10) Patent No.: US 10,021,066 B2
(45) Date of Patent: Jul. 10, 2018

(54) CLUSTERED SERVER SHARING

(71) Applicant: MORGAN STANLEY, New York, NY (US)

(72) Inventors: Andrei Keis, Fort Lee, NJ (US); Richard Viana, Summit, NJ (US)

(73) Assignee: MORGAN STANLEY, New York, NY (US)

( * ) Notice: Subject to any disclaimer, the term of this patent is extended or adjusted under 35 U.S.C. 154(b) by 477 days.

(21) Appl. No.: 14/714,717

(22) Filed: May 18, 2015

(65) Prior Publication Data
US 2016/0344690 A1 Nov. 24, 2016

(51) Int. Cl.
G06F 15/16 (2006.01)
H04L 29/12 (2006.01)

(52) U.S. Cl.
CPC ...... H04L 61/2007 (2013.01); H04L 61/2514 (2013.01); H04L 61/2525 (2013.01)

(58) Field of Classification Search
CPC ............ H04L 61/2007; H04L 61/2525; H04L 61/2514; H04L 61/256
USPC ....................................................... 709/245
See application file for complete search history.

(56) References Cited

U.S. PATENT DOCUMENTS

| 6,353,614 | B1* | 3/2002 | Borella | H04L 29/12009 370/389 |
| 7,721,290 | B2* | 5/2010 | Horikawa | G06F 9/4862 709/201 |
| 8,284,782 | B1* | 10/2012 | Maufer | H04L 61/103 370/351 |
| 8,832,235 | B1* | 9/2014 | Rozhin | H04L 41/0806 709/220 |
| 9,195,491 | B2* | 11/2015 | Zhang | H04L 41/0823 |
| 9,483,490 | B1* | 11/2016 | Iyengar | G06F 17/30079 |
| 9,602,344 | B1* | 3/2017 | Iyengar | G06F 8/76 |
| 2005/0013280 | A1* | 1/2005 | Buddhikot | H04L 29/12358 370/349 |
| 2005/0108709 | A1* | 5/2005 | Sciandra | G06F 9/505 718/1 |
| 2005/0273787 | A1* | 12/2005 | Kovachka-Dimitrova | H04L 67/34 719/310 |
| 2006/0095435 | A1* | 5/2006 | Johnson | G06F 8/71 |
| 2008/0071927 | A1* | 3/2008 | Lee | H04L 29/12358 709/245 |
| 2010/0185725 | A1* | 7/2010 | Camarillo | H04L 29/06027 709/203 |
| 2010/0262977 | A1* | 10/2010 | Havemose | G06F 9/545 719/310 |
| 2011/0002339 | A1* | 1/2011 | Fok | H04L 29/12481 370/401 |
| 2011/0047256 | A1* | 2/2011 | Babu | H04L 29/12367 709/223 |
| 2013/0125120 | A1* | 5/2013 | Zhang | H04L 41/0823 718/1 |

(Continued)

Primary Examiner — Joseph E. Avellino
Assistant Examiner — Binod J Kunwar
(74) Attorney, Agent, or Firm — Weitzman Law Offices, LLC

(57) ABSTRACT

A method and a system environment allowing installation of an application into excess capacity of an existing server and that allows the application to coexist with a legacy application on the server without interfering with the legacy application and without requiring a new host name, via use of custom shared libraries and network address translation.

16 Claims, 4 Drawing Sheets

(56) References Cited

U.S. PATENT DOCUMENTS

| | | | |
|---|---|---|---|
| 2013/0132532 A1* | 5/2013 | Zhang | H04L 41/0823 709/220 |
| 2014/0053150 A1* | 2/2014 | Barnett | G06F 9/455 718/1 |
| 2015/0106489 A1* | 4/2015 | Duggirala | H04L 61/2503 709/222 |
| 2015/0358285 A1* | 12/2015 | Ellard | H04L 63/02 726/12 |

\* cited by examiner

CLUSTERED SERVER SHARING

BACKGROUND

1. Field

This disclosure relates generally to computers, and, more particularly, to client-server architecture infrastructure.

2. Background

Most businesses use multiple networked servers, in some cases, many, many servers networked into clusters to handle their IT infrastructure needs. However, typical server deployments, particularly data center servers, underutilize server capacity for various reasons, for example, to allow for performance spikes or due to the possibility of interference between applications/programs. Note, as used herein, the terms "application" and "program" are used interchangeably to refer to non-operating system software that can be deployed and run on a server.

In general, if there is a need to add new applications/programs that require network discoverability into that network, currently either new additional servers or significant changes are required, which can be a costly endeavor in terms of added equipment (i.e., hardware and associated physical items), the extent of the network changes that may be needed, and the associated cost of the maintenance/personnel and potentially, the cost of downtime.

It is well known that applications/programs rarely use the full capabilities of existing servers on which they run, particularly in a clustering environment, leaving many servers with underutilized, excess capacity. Because of the way programs are written in order to be able to communicate with the "outside world" (i.e., other computers on the network, be it a small network within the company or the internet), if one needs to add an application/program in a clustering environment it is extremely difficult to use that underutilized, excess server capacity alongside the existing (i.e., "legacy") applications/programs. Certain classes of applications use a technique called application discovery to advertise their presence on a network. When such an application is added to a network, it needs to be configured with one or more ports through which other programs will communicate with it. To do this, when the application is initially installed or run on a server, the application will "announce" to the network "I am here" and provide a zero value for the port value indicating where "here" is. The operating system, which maintains a table of all used and available ports for each server (denoted by a "Host Name"), will then assign a free port in place of the zero value, and thereafter, that is the port through which the application/program will be reachable from the other programs. Various programs may be used to implement the service discovery process/protocol including, for example, in the Linux™ environment, Apache™ ZooKeeper™, Consul™, Etcd™, Eureka™, etc.

Unfortunately, a current trend is to use "lightweight containers" for applications in clustered server environments. This creates a technological impediment that prevents, or makes very difficult, the use of any existing excess server capacity for applications of this class. That is because each lightweight container must be isolated from any other lightweight containers (hereafter referred to as "legacy components") on the same server(s), i.e., they cannot use any of the same ports. Yet, each lightweight container has its ports independently dynamically assigned without regard to any other lightweight container. As a result, presently, the only way to ensure independence when adding a new lightweight container to an existing server would be to add a new hostname for that lightweight container on that existing Host (if possible). However, adding a new hostname requires significant additional detailed work, additional IP addresses, it requires new security for that Host, and additional complexity that must be supported, etc.

Thus, there is presently a significant technological problem inhibiting the ability to make use of that excess capacity by adding applications that run in lightweight containers onto one or more servers that already contain legacy components.

BRIEF SUMMARY

One aspect of this disclosure involves a method performed on a server that is part of a network. The server has space representing excess capacity, a Host IP address and at least one legacy application running in a legacy container. The method involves: using a custom shared library, in response to a request to run a new application in a new container, creating the new container on the server hosting the legacy container, installing the new application in the new container, intercepting a port discovery system call from the new application, and assigning a non-routable IP address pair to the new container; using a destination network address translation ("DNAT") forwarding rule of the shared library, for each port the new application intends to listen on, to handle routing of packets directed to the new application; and using at least one NAT masquerade rule to modify packets sent by the new application onto the network so that network traffic from the new application will appear as if it is coming from the Host IP address, so that the new application in the new container will run in the space that was the excess capacity prior to creation of the new container on the server independent of the legacy application and neither the new application nor the legacy application will interfere with each other.

Advantageously, this technique allows a lightweight container application, using network discovery techniques, to have network conversations on the network despite its IP address being a non-routable IP in a container.

Another aspect of this disclosure involves a server environment system comprising multiple servers interconnected to each other on a network. The system involves a first server controlled by an operating system and having a host IP address, a first application installed in a first container thereon and a second application running in a second container thereon. The second container is identified by a non-routable IP address. The system further involves a custom shared library including a DNAT forwarding rule for each port that the second application listens on, and at least one NAT masquerade rule that will modify an IP address in packets directed by the second application onto the network. The custom shared library is interposed between the second container and the network and configured to trap network traffic intended for the second container and redirect it to the second container using the DNAT forwarding rule and to modify packets from the second container directed to the network so that the packets from the second container will appear to other servers on the network as if they are coming from the Host IP address.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

We have devised a technological solution to the above problems, that allows for use of excess capacity of an existing Host server for a new network-discoverable (from a client perspective) application alongside a legacy application having a hostname on that existing Host server in instances where the new application is to be run inside a new container having its own namespace where the new container in which the new application will be installed shares its hostname with the Host.

Our solution is a technological advance in this important area because it does not require a new Host name, IP address, or changes to the application/program (i.e., the application/program is "container unaware") while still allowing for dynamic installation of the application/program and port assignment.

In simplified overview, one variant of our approach uses a framework that takes advantage of the shared libraries and "LD-PRELOAD" capability of the Linux™ and Unix™ operating systems to capture and re-route traffic to/from the application such that it appears as if the listen and output ports are normal routable ports external to the container, even though the ports the new application itself uses are non-routable ports, although a similar variant of our approach can be implemented with other operating systems. Note here that, there are numerous variants of UNIX™ and Linux™, in the case of Linux™, sometimes referred to as "flavors" of Linux™. As used herein, the term "Linux" is intended to encompass any or all such variants or flavors as well as any variant of UNIX™ that includes the "LD-PRELOAD" capability or functionality. For example, aspects of our approach can also be implemented using the "DYLD_INSERT_LIBRARIES" capability of Apple™'s OS X operating system or, in the Windows™ operating system, to a lesser extent, via the "Windows Firewall with Advanced Security" feature.

Figure 1:
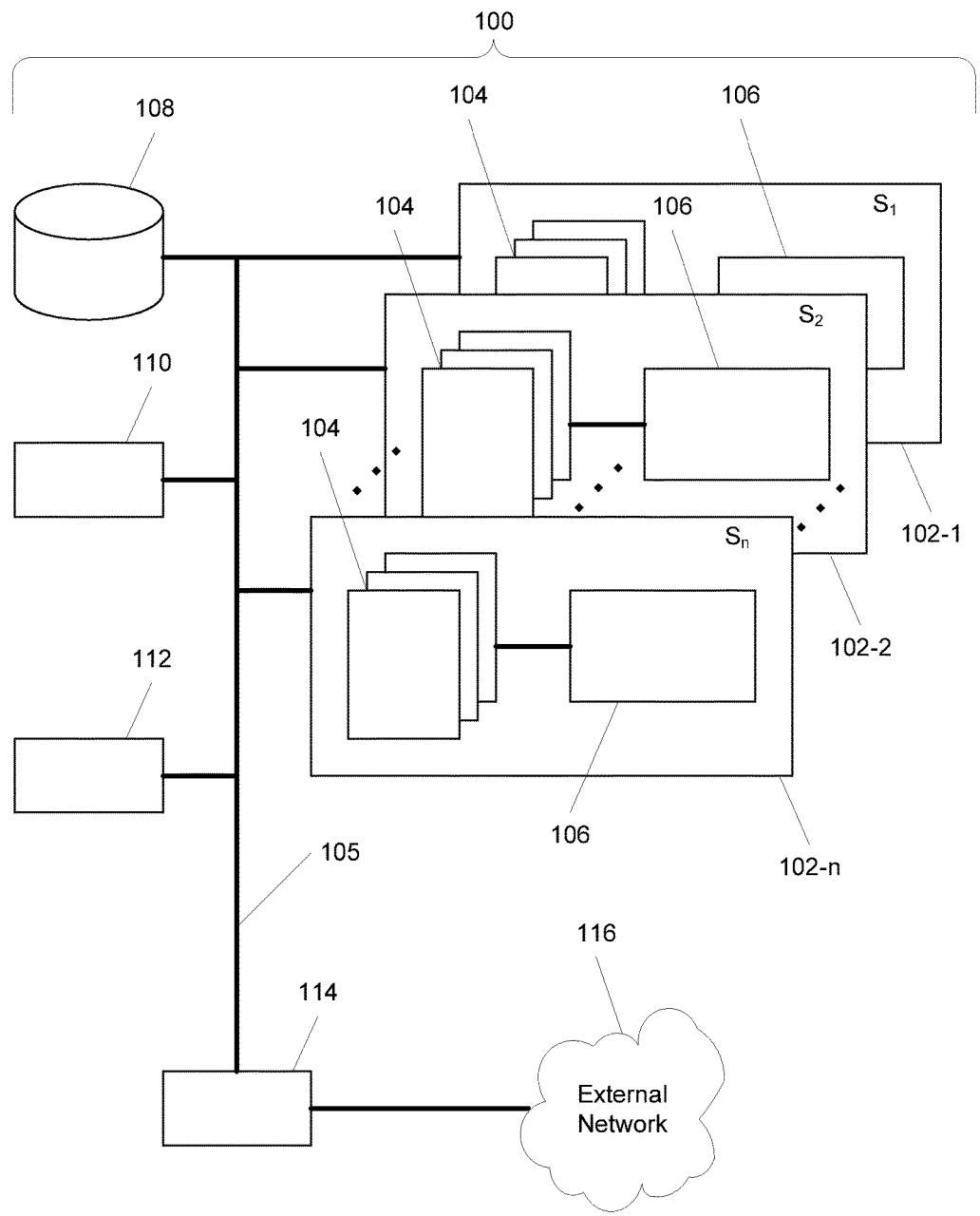
FIG. 1 illustrates, in simplified form, an example hardware environment suitable for implementation of, and implementing, the approach described herein.

FIG. 1 illustrates, in simplified form, an example hardware environment 100 suitable for implementation of, and implementing, the approach described herein. As shown in FIG. 1, the system is made up of multiple servers $S_1$ through $S_n$ 102-1, 102-2, . . . , 102-n each containing at least one, and potentially more (such as shown), processor(s) 104 coupled to memory 106, in the form of, for example, RAM, ROM, program storage, cache, buffers, etc. so that the processor(s) 104 can execute programs and access data. The servers 102-1, 102-2, . . . , 102-n are networked, over a system bus 105, to each other and, for example, non-volatile mass storage 108, I/O 110, other internal devices 112 on the network, for example, one or more of printers, displays, routers, scanners, etc., and an appropriate external network gateway 114, through which they may be coupled, in a conventional manner, to an external network 116, for example, the internet or a telecommunications network. The physical items that can constitute the components 102-1, 102-2, . . . , 102-n, 104, 106, 108, 110, 112 and 114 are all well known and thus will not be described in any further detail.

Figure 2:
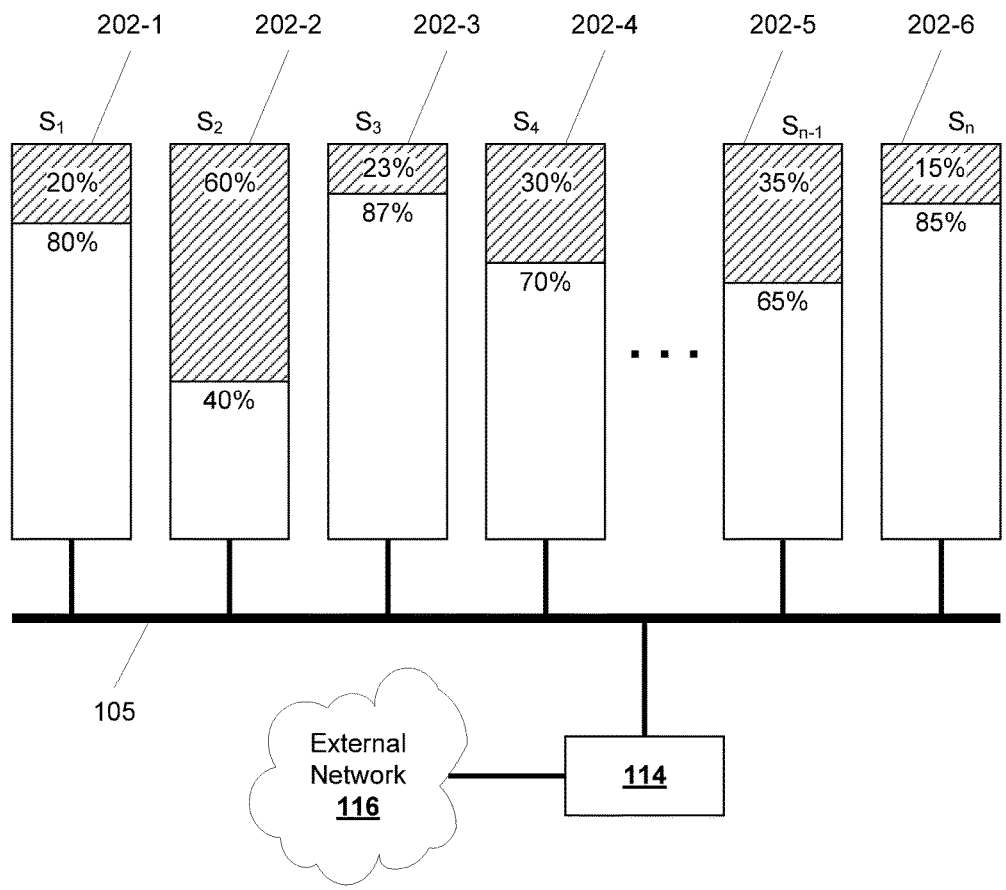
FIG. 2 illustrates, in simplified form, a set of servers that are the same as, or analogous to, the servers of FIG. 1 but showing server utilization immediately before implementation of our solution.

FIG. 2 illustrates, in simplified form, a set of servers $S_1$, $S_2$, $S_3$, $S_4$, . . . $S_{n-1}$, $S_n$, (202-1, 202-2, 202-3, 202-4, 202-5, 202-6) that are the same as, or analogous to, the servers 102-1, 102-2, . . . , 102-n of FIG. 1 but representing for each, server utilization immediately before implementation of our solution. As shown in FIG. 2, each of the servers 202-1, 202-2, 202-3, 202-4, 202-5, 202-6 has certain amount of maximum utilization of the overall capacity and, consequently, a some amount of unused capacity. For example, Server $S_1$ has 80% of its overall capacity being used by legacy programs, leaving 20% unused capacity, Server $S_{n-1}$ has only 65% of its overall capacity being used by legacy programs, leaving 35% unused capacity, and Server $S_2$ has only 40% of its overall capacity being used by legacy programs, leaving 60% unused capacity. As noted above, this means that, for just those three servers, there is 115% unused capacity, so more than a full server's-worth of capacity is being lost from those three servers alone.

As also noted above, and as will now be described, we have devised a solution to the problem by deploying a compute fabric on top of an existing server infrastructure that allows the unused capacity of a server, for example, Server $S_2$ 202-2 of FIG. 2, to be used by another container without needing a new Host Name or incurring the problems noted above.

As a backdrop to the solution, it is worth again noting the operational constraints for our solution. First, the new applications will run inside containers that each have a separate namespace. Second, the containers do not have a routable IP address and share a Host Name with the Host. Third, the new application to be added alongside the legacy application(s) can be run inside a container without requiring any changes be made to the already-present legacy application(s). In other words, there is no need to do anything to the legacy application and it will be unaffected by the new application once the new application is installed. Fourth, the new application is of a type that will be unaware that it is being run in a container. Fifth, from the client-side and operating system perspective, there is a discovery process that results in the actual pairing of the IP address of a Host and a port. Sixth, the installation of the application inside the container is dynamic and non-deterministic.

Our solution employs a two-part framework, one part that runs on top of the operating system on its own server and another part, installed on the existing server(s), to collectively coordinate container creation, management and cleanup using the preloading of shared libraries (ahead of other libraries) to thereby implement a novel approach to port forwarding which will now be discussed with reference to FIG. 3. In this regard, FIG. 3 illustrates, in simplified form, a functional representation 300 of the functional components involved in one example implementation of our approach (in a Linux environment) to install a new application alongside a legacy application on, for example, the Server $S_2$ 202-2 of FIG. 2.

Figure 3:
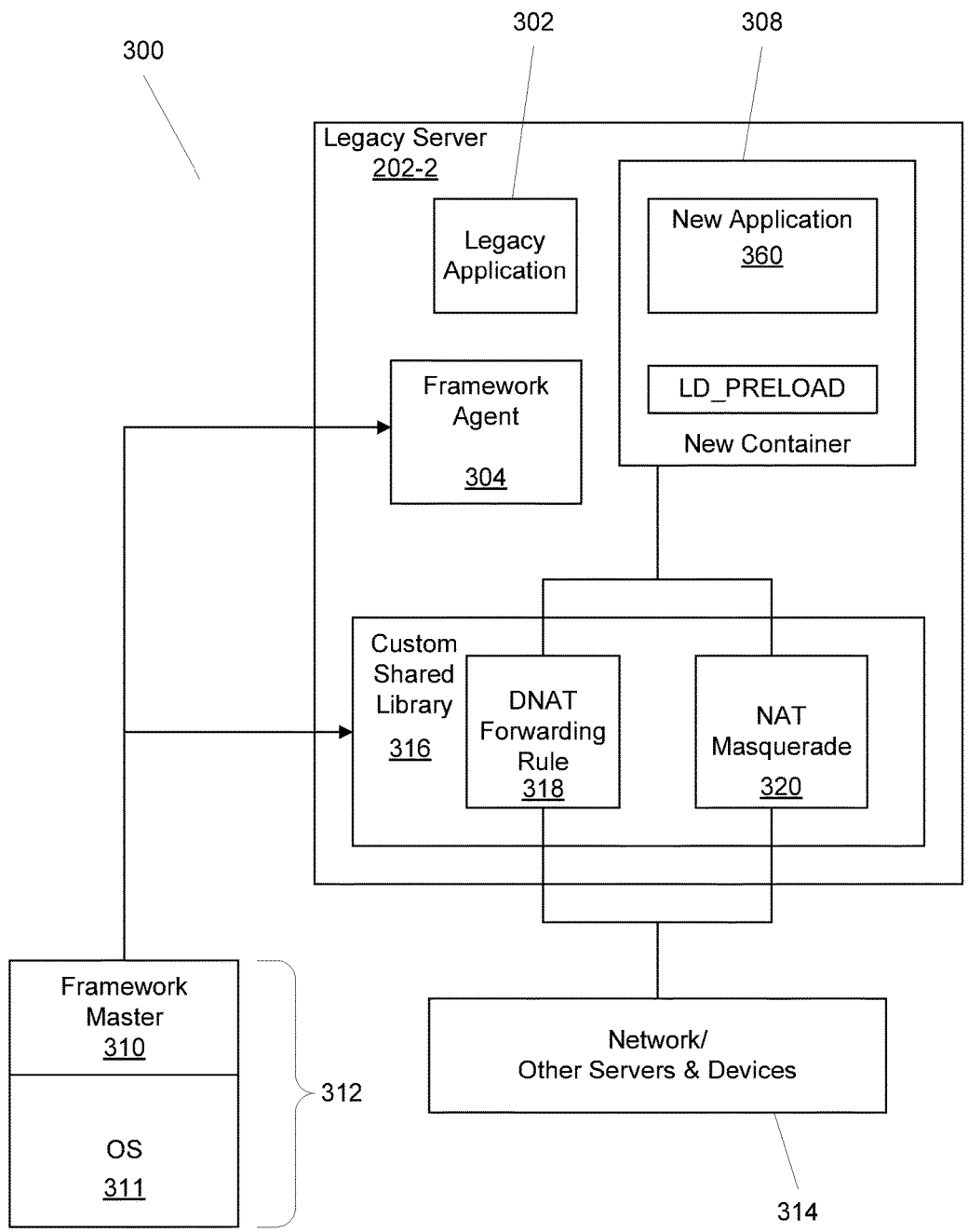
FIG. 3 illustrates, in simplified form, a functional representation of the functional components involved in implementing our approach on, for example, the Server $S_2$ of FIG. 2.

As shown in FIG. 3, a legacy application 302 is already installed and running on the Server $S_2$ 202-2. According to our approach, a new application 306 will be installed in a new container 308 on that same Server $S_2$ 202-2. This aspect is, as noted above, handled by our framework. The framework is made up of two parts, a framework agent 304, which is installed on each legacy server where a new application could be installed, and a framework master 310 which runs on top of the operating system 311 of its own server 312 and, in the case of a Linux operating system environment, uses library pre-loading to create the new container 308 on the specified server, in this case, Server $S_2$ 202-2 and manages the new application's interaction with other applications, containers and the "outside world" 314 (e.g., the network/other servers & devices). Specifically, it uses the LD-PRELOAD environment variable to load a shared custom library 316 that will create the new container 308 for the new application 306 and manage port forwarding to and from that container. More specifically, the framework components 304, 310 will:

a) allocate one or more non-routable IP addresses and configure (and later start) a new container 308 on the designated server with a separate namespace and the non-routable IP address(es) allocated to that new container 308 (e.g., an IP pair is assigned because the new container will be a virtual ethernet device);

b) create one or more Destination Network Address Translation forwarding rule(s) 318 to rewrite the Destination IP address of packets (i.e., change the recipient IP address) for each port that the new application 306 intends to listen on; and c) create one or more Network Address Translation Masquerade rule(s) 320 so that every packet leaving the new container 308 receives the IP address of the new container's outgoing interface (i.e., so that outgoing network traffic will appear as if it is coming from the Host IP address).

As a result of the above, a new application 306 running in the new container 308 alongside the legacy application 302 will look like this to the "External" Network/Other Servers/Devices 316:

EXTERNAL=>[host:<dynamic port>]=>DNAT=>[new container interface:<fixed port>]

As noted above, port assignment for the new application is dynamic, and so it cannot be predicted and is assigned by the framework when the new container 308 is started. This aspect is accomplished in a similar manner to what is conventionally done for dynamic port assignment, namely, a "zero" (or some "placeholder" value) is initially passed by an application, as part of the discovery process, as its listening port using a system call in order to get back a free port on which it will actually listen on. However, in contrast, to the conventional approach, the framework uses the LD-PRELOAD to load the framework's custom shared library 316 ahead of any other library. The framework's custom shared library 316 is configured so that it will intercept the conventional discovery system call and assign the [host:<dynamic port>] pair and publish that pair in the discovery process. Specifically, the framework pre-allocates a set of externally viewable ports that are used by the custom shared library 316 as a pass-through and, through dynamic assignment, will return one of those pre-allocated ports to the new container 308 such that the externally viewable port for the new container 308 and the internally assigned port for the new container 308 match. This will enable the new application 306 in the new container 308 to operate independent of, and avoid interference with, the legacy application 302.

Thus, as a result of using the framework 310, from the perspective of the new application 306 in the new container 308 on the legacy server, e.g., Server $S_2$ 202-2, the following will be true:

a) The new container 308 will share the hostname with the Host that it is running on;

b) Hostname will resolve to the hostname of the Host;

c) A reverse DNS lookup of the hostname will return the IP address of the host, not of the new container 308 (or the legacy container 304);

d) The network interface that is visible to the container will be in the "non-routable" range, defined as "Private-Use Networks" in IETF RFC-3330 and RFC-5735 as IP addresses in the ranges: 10.1.1.1 to 10.255.255.254, or 172.16.1.1 to 172.31.255.254, or 192.168.1.1 to 192.168.255.254 for IPv4 addresses or, for the IPv6 address space, the unique local address ("ULA") equivalent space of fc00::/7 or any address that starts with "fdxx:" where each "x" represents a hexadecimal character; and e) The new application 306 in the new container 308 and the legacy application 302 in the legacy container 304 will not interfere with each other despite being present on the same Host they are running on.

Figure 4:
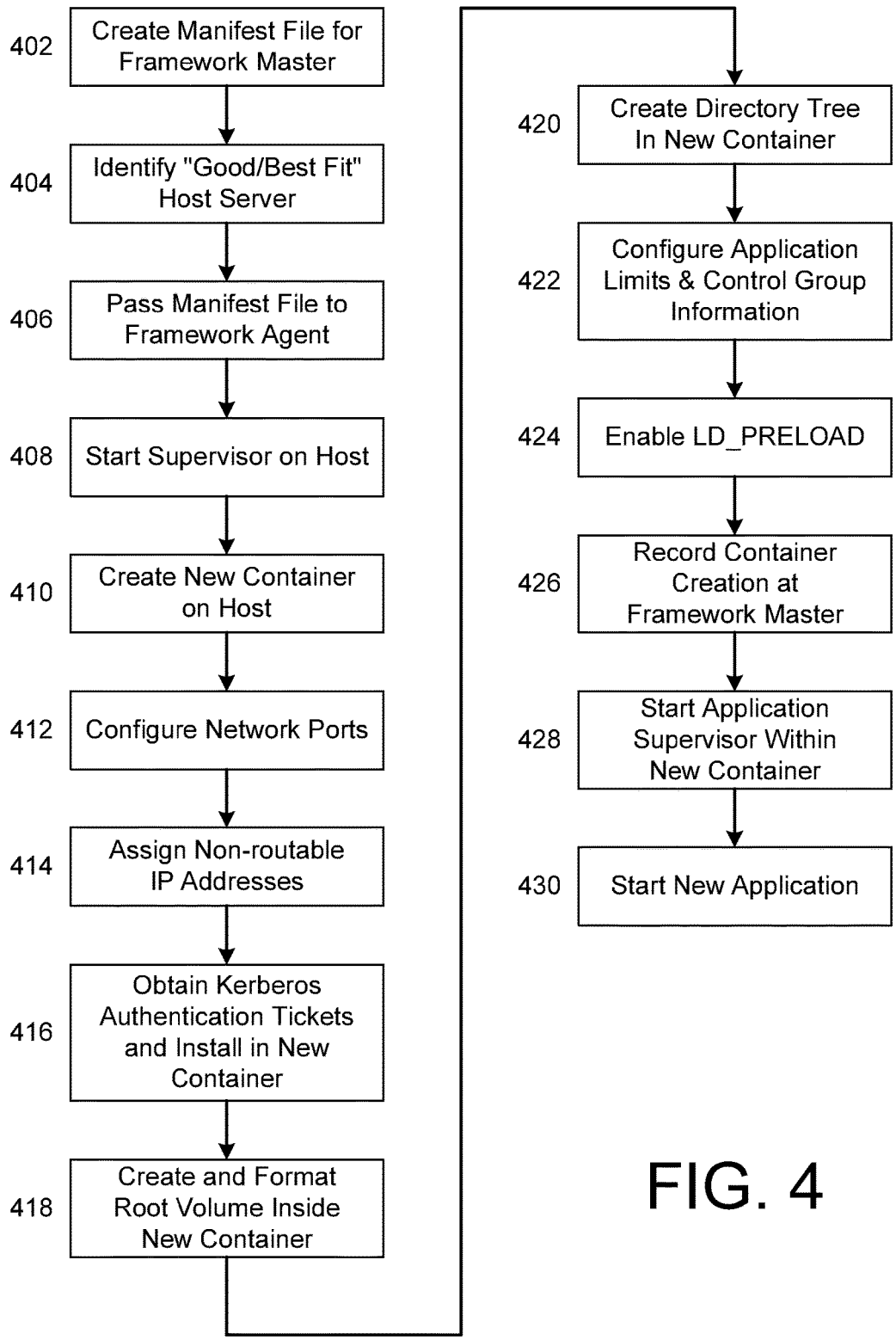
FIG. 4 illustrates, in simplified form, a flowchart of the overall process from the perspective of our framework.

FIG. 4 illustrates, in simplified form, a flowchart of the overall process from the perspective of our framework.

The process begins with the creation of a manifest file on the framework master 310 for the new application to be installed within the excess capacity of a legacy server (Step 402).

Next, the framework master 310 selects a host server, from among the existing servers $S_1$ through $S_n$, whose excess capacity is a good fit or the best fit for hosting the new container (Step 404).

The framework master 310 then passes the manifest file for the new application to the framework agent 304 on the host server on which the new application will be installed (Step 406).

The framework agent 304 that receives the manifest file then starts a supervisor on its host server (Step 408) which is used to create and manage the new container 308 and the log files that will be associated with it (Step 410).

Then, the listen and output ports for the new container 308 are configured (Step 412) and the non-routable IP addresses are assigned to the new container 308 (Step 414).

The framework then obtains Kerberos authentication tickets and installs them in the new container 308 (Step 416).

Next, a root volume is created and formatted in the new container 308 (Step 418) and a directory tree for the new application 306 is created in the new container 308 (Step 420).

Then, application limits and control group ("cgroup") information is configured to account for and isolate the resource usage (e.g. CPU, memory, I/O, etc.) of the new application 306 (Step 422).

At this point, LD_PRELOAD injects a shared library into the new container and it is enabled for the new container 308 (Step 424).

Once the preceding steps are complete, the framework agent 304 notifies the framework master 310 that the new container 308 has been created (Step 426) and the framework agent 304 starts an application supervisor within the new container 308 for the new application 306 (Step 428) and the application supervisor starts the new application 306 running in the new container 308 (Step 430).

As a result of the above, the new application will now be running on the legacy server without needing a new hostname, its own IP address or separate security set up, thereby taking advantage of the excess capacity of the legacy server that would otherwise go unused.

Having described and illustrated the principles of this application by reference to one or more embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method performed on a server that is part of a network, the server having space representing excess capacity, a Host IP address and at least one legacy application running in a legacy container thereon, the method comprising:
   using a custom shared library, in response to a request to run a new application in a new container,
      to create the new container on the server hosting the legacy container with the space representing the excess capacity,
      to install the new application in the new container,
      to intercept a port discovery system call from the new application, and
      to assign a non-routable IP address pair to the new container;
   using a DNAT forwarding rule of the shared library, for each port the new application intends to listen on, to handle routing of packets directed to the new application; and
   using at least one NAT masquerade rule to modify packets sent by the new application onto the network so that network traffic from the new application will appear as if it is coming from the Host IP address, so that the new application in the new container will run in the space that was the excess capacity prior to creation of the new container on the server independent of the legacy application and neither the new application nor the legacy application will interfere with each other.

2. The method of claim 1, wherein the new container is a virtual ethernet device.

3. The method of claim 1, further comprising the new application, when running, listening within the new container on a non-routable IP address.

4. The method of claim 1, wherein the new application's container shares a hostname with the server and the legacy container.

5. The method of claim 1, wherein the installing the new application in the new container does not require any modifications to be made to the new application.

6. The method of claim 1, wherein the legacy container has a first network namespace and the new container has a second network namespace that is different from the first network namespace.

7. The method of claim 1, wherein, when a reverse DNS lookup of the hostname for the new container is performed, the Host IP address will be returned instead of an IP address of the non-routable IP address pair.

8. The method of claim 1, wherein the new application is container unaware.

9. A server environment system comprising multiple server computing devices connected to each other on a network, the system comprising:
   a first server computing device controlled by an operating system and having a Host IP address, a first application installed in a first container thereon and a second application running in a second container thereon, the second container being identified by a non-routable IP address;
   a custom shared library including
      a DNAT forwarding rule for each port that the second application listens on, and
      at least one NAT masquerade rule that will modify an IP address in packets directed by the second application onto the network;
   the custom shared library being interposed between the second container and the network and configured to trap network traffic intended for the second container and redirect it to the second container using the DNAT forwarding rule and to modify packets from the second container directed to the network so that the packets from the second container will appear to other server computing devices on the network as if they are coming from the Host IP address.

10. The server environment system of claim 9, wherein the second container is a virtual ethernet device.

11. The server environment system of claim 9, wherein the second container shares a hostname with the first server computing device and the first container.

12. The server environment system of claim 9, wherein the first container has a first network namespace and the second container has a second network namespace that is different from the first network namespace.

13. The server environment system of claim 9, wherein the second container has an IP address that is within a non-routable range.

14. The server environment system of claim 13, wherein the non-routable range is an IPv4 address in the range of:
   1.1.1 to 10.255.255.254,
   172.16.1.1 to 172.31.255.254, or
   192.168.1.1 to 192.168.255.254.

15. The server environment system of claim 13, wherein the non-routable range is an IPv6 address within the unique local address ("ULA") space of fc00::/7 or an IPv6 address that starts with fdxx:, where each "x" represents a hexadecimal character.

16. The server environment system of claim 9, wherein the operating system is a Linux operating system.

* * * * *